(No Model.)
W. W. BISSELL.
EYEGLASSES.
No. 465,406.                    Patented Dec. 15, 1891.
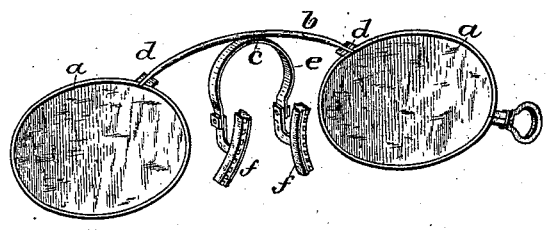
ATTEST.                                   INVENTOR.
J. Henry Kaiser
Elmer J. Bissell                          William W. Bissell.

United States Patent Office.

WILLISTON W. BISSELL, OF ROCHESTER, NEW YORK.

EYEGLASSES.

SPECIFICATION forming part of Letters Patent No. 465,406, dated December 15, 1891.

Application filed July 11, 1891. Serial No. 399,207. (No model.)

*To all whom it may concern:*

Be it known that I, WILLISTON W. BISSELL, a citizen of the United States, residing at Rochester, in the county of Monroe and State of New York, have invented certain new and useful Improvements in Eyeglasses; and I do declare the following to be a full, clear, and exact description of the invention, such as will enable others skilled in the art to which it appertains to make and use the same, reference being had to the accompanying drawing, and to the letters of reference marked thereon, which form a part of this specification.

This invention relates to eyeglasses, especially to that species of the same which is employed to correct a defect in vision known as "astigmatism."

Heretofore, in order to secure the necessary rigidity to maintain the lenses at a fixed angle, it has been customary to employ the ordinary spectacle-frames to hold the so-called "astigmatic lenses."

The object of this invention is to provide an improved eyeglass-frame or so-called "rimless trimmings," to receive and hold the two lenses in such a position that under all circumstances, whether on or off the face, the horizontal and perpendicular meridians of the one lens maintain the same relation to the horizontal and perpendicular meridians of the other lens, and thereby secure in a noseglass frame all the advantages of a spectacle-frame for astigmatic or cylindrical lenses or prisms.

The accompanying drawing is a front view of my invention.

The eye-wires $a\ a$ inclosing the astigmatic lens of the form required are of ordinary construction and are joined together with screw-joints at $d\ d$, which also inclose the bar $b$. It is also to be understood that the eye-wires can be dispensed with, if desired, and the bar $b$ joined by rivets directly to the lenses, thus forming rimless glasses. The bar $b$, connecting the two lenses, is rigid and may be either straight or curved. By the employment of this rigid bar the lenses are kept in a fixed relation to each other, and are held firmly at the required angle necessary to correct the defect in vision, which object could not be accomplished were the bar joining the lenses of the ordinary flexible character. Midway of the rigid bar $b$ there is joined at $c$, either by means of a screw or by soldering, the curved flexible spring $e$, to the lower ends of which are attached the nose-clamps $f\ f$, which are of ordinary construction, and may be attached to the curved spring either by a screw-joint or solder. The curved spring can, by varying its flexibility and size, be adapted to fit the nose of any person. It will thus be seen that my invention secures the advantages of neatness of appearance and simplicity and durability of construction, which cannot be attained in the spectacle-frames ordinarily used with astigmatic lenses.

What I claim as my invention, and desire to secure by Letters Patent, is—

In astigmatic eyeglasses, the combination, with the rigid bar $b$, of a curved spring $e$, joined to the center of said bar, and having nose-clamps $f\ f$, pivotally fastened at each end thereof, substantially as described.

In testimony whereof I affix my signature in presence of two witnesses.

WILLISTON W. BISSELL.

Witnesses:
ELMER J. BISSELL,
JOHN HALL.